United States Patent
Zhang et al.

(10) Patent No.: US 12,544,452 B2
(45) Date of Patent: Feb. 10, 2026

(54) SUPERPARAMAGNETISM-MODIFIED AND NEUTROPHIL EXOSOME BIOMIMETIC VESICLE-BASED BIOLOGICAL PREPARATION FOR DRUG DELIVERY, AND PREPARATION METHOD THEREOF

(71) Applicant: JIANGSU UNIVERSITY, Zhenjiang (CN)

(72) Inventors: Xu Zhang, Zhenjiang (CN); Jiahui Zhang, Zhenjiang (CN); Cheng Ji, Zhenjiang (CN); Hui Shi, Zhenjiang (CN); Wenrong Xu, Zhenjiang (CN); Hui Qian, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 346 days.

(21) Appl. No.: 17/787,909

(22) PCT Filed: Apr. 26, 2021

(86) PCT No.: PCT/CN2021/089946
§ 371 (c)(1),
(2) Date: Jun. 21, 2022

(87) PCT Pub. No.: WO2022/198742
PCT Pub. Date: Sep. 29, 2022

(65) Prior Publication Data
US 2023/0270880 A1   Aug. 31, 2023

(30) Foreign Application Priority Data
Mar. 26, 2021   (CN) .......................... 202110324298.1

(51) Int. Cl.
*A61K 47/69*   (2017.01)
*A61K 47/52*   (2017.01)
*B03C 1/02*    (2006.01)
*C12N 5/0787*  (2010.01)

(52) U.S. Cl.
CPC .......... *A61K 47/6901* (2017.08); *A61K 47/52* (2017.08); *B03C 1/02* (2013.01); *C12N 5/0642* (2013.01); *B03C 2201/18* (2013.01); *C12N 2501/06* (2013.01)

(58) Field of Classification Search
None
See application file for complete search history.

(56) References Cited

U.S. PATENT DOCUMENTS

2017/0248508 A1* 8/2017 Ward .................. G01N 33/5091
2022/0287967 A1* 9/2022 Jyothi .................... A61K 38/18

FOREIGN PATENT DOCUMENTS

| CN | 110699320 A | * | 1/2020 | ............. A61K 35/15 |
|----|-------------|---|--------|-------------------------|
| CN | 110934851 A |   | 3/2020 |                         |
| CN | 111035769 A |   | 4/2020 |                         |
| CN | 111996167 A | * | 11/2020 | ........... C12N 5/0645 |

OTHER PUBLICATIONS

Wang, Lu and Liu, Jinyao, "Engineered drug-loaded cells and cell Derivatives as a delivery platform for cancer immunotherapy", The Royal Society of Chemistry, 2021, 9, pp. 1104-1116.
State Intellectual Property Office of People's Republic of China, Search Report, China Patent Application No. CN202110324298.1, May 4, 2022, 3 pages.
International Searching Authority, International Search Report, International Patent Application No. PCT/CN2021/089946, Dec. 30, 2021, 4 pages.
International Searching Authority, Written Opinion, International Patent Application No. PCT/CN2021/089946, Dec. 30, 2021, 4 pages.
International Searching Authority, International Preliminary Report on Patentability, International Patent Application No. PCT/CN2021/089946, Sep. 12, 2023, 5 pages.
The State Intellectual Property Office of People's Republic of China, First Office Action, China Patent Application No. 202110324298.1, May 13, 2022, 6 pages.

* cited by examiner

*Primary Examiner* — Nghi V Nguyen
(74) *Attorney, Agent, or Firm* — Tutunjian & Bitetto. P.C.

(57) ABSTRACT

The present disclosure provides a superparamagnetism-modified and neutrophil exosome biomimetic vesicle-based biological preparation for drug delivery, and a preparation method thereof, belonging to the technical field of engineered nanovesicle drug loading systems. The superparamagnetism-modified and neutrophil exosome biomimetic vesicle-based biological preparation for drug delivery prepared by the preparation method acts on tumor cell lines. It is found that the superparamagnetism-modified and neutrophil exosome biomimetic vesicle-based biological preparation for drug delivery can specifically target tumor cells, induce tumor cell apoptosis, and inhibit tumor growth. The biological preparation significantly extends a survival time of mice and improves an efficacy of drugs against cancers.

16 Claims, 4 Drawing Sheets b a

SUPERPARAMAGNETISM-MODIFIED AND NEUTROPHIL EXOSOME BIOMIMETIC VESICLE-BASED BIOLOGICAL PREPARATION FOR DRUG DELIVERY, AND PREPARATION METHOD THEREOF

CROSS REFERENCE TO RELATED APPLICATION

The present application claims priority to International Patent Application No. PCT/CN2021/089946 filed on Apr. 26, 2021 which claims priority to Chinese Patent Application No. 202110324298.1 filed to the China National Intellectual Property Administration (CNIPA) on Friday, Mar. 26, 2021 and entitled "SUPERPARAMAGNETISM-MODIFIED AND NEUTROPHIL EXOSOME BIOMIMETIC VESICLE-BASED BIOLOGICAL PREPARATION FOR DRUG DELIVERY, AND PREPARATION METHOD THEREOF", which is incorporated herein by reference in its entirety.

TECHNICAL FIELD

The present disclosure belongs to the technical field of engineered nanovesicle drug loading systems, in particular to a superparamagnetism-modified and neutrophil exosome biomimetic vesicle-based biological preparation for drug delivery, and a preparation method thereof.

BACKGROUND ART

Cancer is a disease that seriously threatens human health. Most cancers are diagnosed at an advanced stage, resulting in a poor prognosis for patients. Chemotherapy is currently the most common treatment for cancers. However, most chemotherapeutics are toxic to normal cells and lack targeting ability. Therefore, the emergence of extracellular vesicles opens up new prospects for tumor-targeted therapy. From the perspective of natural cell-derived nanocarriers, the extracellular vesicles have relatively low biotoxicity, and can be designed into a complex with targeted antitumor effects as an excellent nanocarrier. So far, many studies have been conduct to deliver proteins, RNAs or other small-molecule drugs through the extracellular vesicles to treat diseases. However, neutrophil exosome biomimetic vesicles have not been studied in the field of oncology.

SUMMARY

In view of this, an objective of the present disclosure is to provide a superparamagnetism-modified and neutrophil exosome biomimetic vesicle-based biological preparation for drug delivery, and a preparation method thereof. The superparamagnetism-modified and neutrophil exosome biomimetic vesicle-based biological preparation for drug delivery can specifically target cancer cells, thereby inhibiting proliferation of the cancer cells and delaying occurrence and development of cancers.

To achieve the above objective, the present disclosure provides the following technical solutions.

The present disclosure provides a preparation method of a superparamagnetism-modified and neutrophil exosome biomimetic vesicle-based biological preparation for drug delivery. including the following steps: 1) conducting co-culture on peripheral blood neutrophils with an antitumor drug to obtain neutrophils for uptake of the drug;

2) conducting centrifugation on the neutrophils for uptake of the drug, and resuspending a bottom cushion to obtain a cell suspension;

3) conducting continuous physical extrusion and gradient filtration on the cell suspension to obtain a neutrophil exosome biomimetic vesicle-encapsulated drug suspension; where the gradient filtration is conducted with polycarbonate filter membranes of 1 μm, 400 nm, and 200 nm sequentially;

4) conducting centrifugation on the neutrophil exosome biomimetic vesicle-encapsulated drug suspension, resuspending a bottom neutrophil nano vesicle (NNV)-drug cushion to obtain an NNV-drug suspension; and 5) mixing the NNV-drug suspension with a superparamagnetism material for co-incubation, and conducting magnetic separation on a co-incubated mixture to obtain the superparamagnetism-modified and neutrophil exosome biomimetic vesicle-based biological preparation for drug delivery.

Preferably, in step 1), each $1 \times 10^6$ of the peripheral blood neutrophils may be co-cultured with 50 μg of the antitumor drug.

Preferably, in step 1), the co-culture may be conducted at 37° C. for 12 h to 24 h.

Preferably, in step 2), the centrifugation may be conducted by differential centrifugation at 800 g for 5 min.

Preferably, in step 3), the continuous physical extrusion may be conducted 11 times on the cell suspension using a mini-extrader extruder.

Preferably, in step 4), the centrifugation may be conducted by ultracentrifugation at 10,000 g for 80 min.

Preferably, in step 5), the superparamagnetism material may include Tf-SPION with a concentration in the NNV-drug suspension of 0.5 mg/ml.

Preferably, in step 5), the co-incubation may be conducted at 4° C. for 4 h.

Preferably, in step 5), the magnetic separation may be conducted by a neodymium magnet at a magnetic flux (MF) density of 1 T.

The present disclosure further provides a superparamagnetism-modified and neutrophil exosome biomimetic vesicle-based biological preparation for drug delivery prepared by the preparation method.

The present disclosure provides the preparation method of a superparamagnetism-modified and neutrophil exosome biomimetic vesicle-based biological preparation for drug delivery. In the method, the neutrophils phagocytosing doxorubicin (DOX) are extruded through polycarbonate filter membranes of 1 μm, 400 nm, and 200 nm sequentially using a mini-extrader extruder, to form the neutrophil exosome biomimetic vesicle-based biological preparations for drug delivery with different particle sizes.

In examples of the present disclosure, the superparamagnetism-modified and neutrophil exosome biomimetic vesicle-based biological preparation for drug delivery prepared by the preparation method acts on tumor cell lines. It is found that the superparamagnetism-modified and neutrophil exosome biomimetic vesicle-based biological preparation for drug delivery can specifically target tumor cells, induce tumor cell apoptosis, and inhibit tumor growth. The biological preparation significantly extends a survival time of mice, and improves an efficacy of drugs against cancers.

DETAILED DESCRIPTION OF THE EMBODIMENTS

Figure 1:
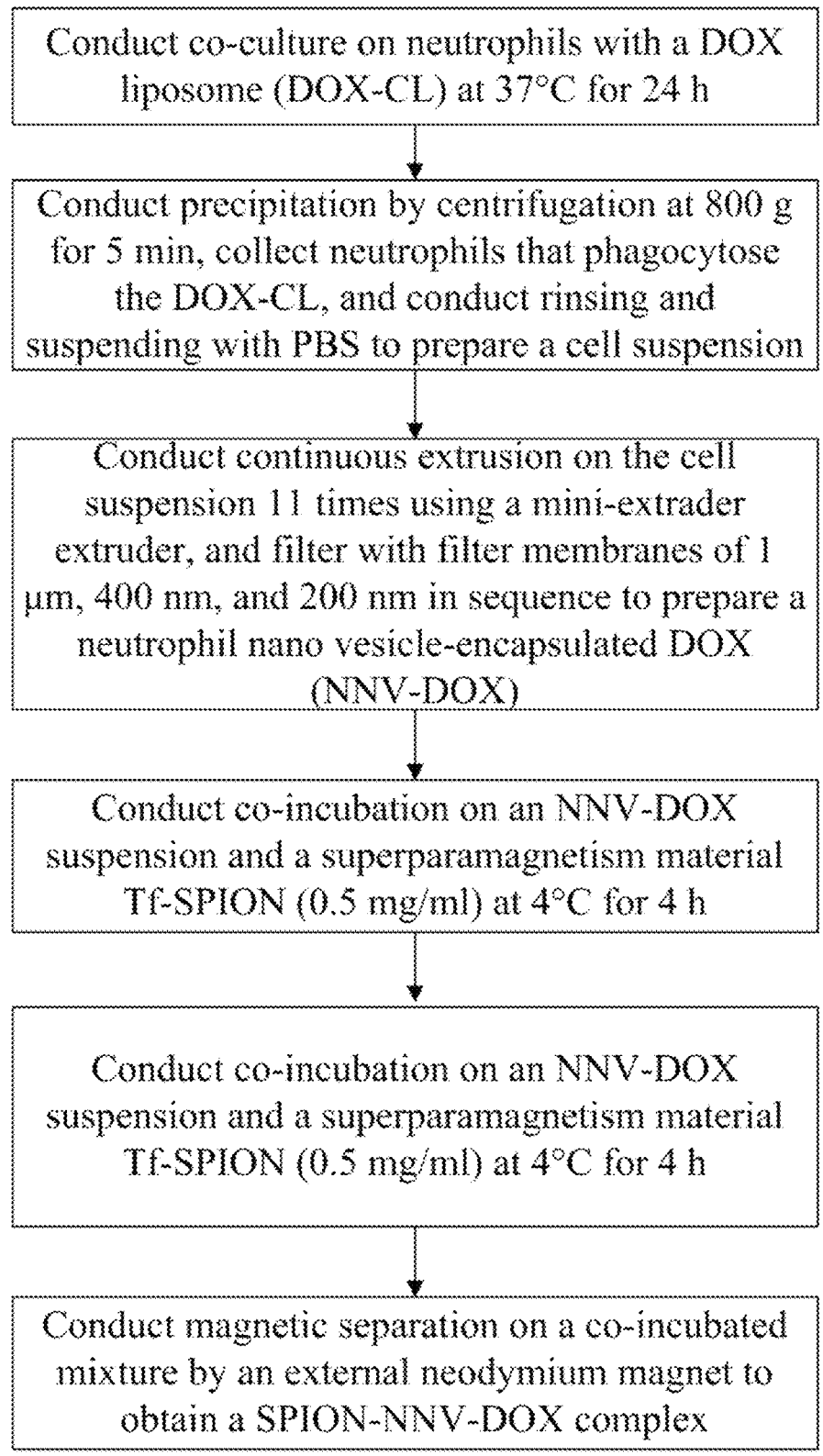
FIG. 1 shows a flow chart of a preparation method of a superparamagnetism-modified and neutrophil exosome biomimetic vesicle-based biological preparation for drug delivery in Example 1.

The present disclosure is further described below with reference to the accompanying drawings and examples.

The present disclosure provides a preparation method of a superparamagnetism-modified and neutrophil exosome biomimetic vesicle-based biological preparation for drug delivery, including the following steps: 1) conducting co-culture on peripheral blood neutrophils with an antitumor drug to obtain neutrophils for uptake of the drug;
2) conducting centrifugation on the neutrophils for uptake of the drug, and resuspending a bottom cushion to obtain a cell suspension;
3) conducting continuous physical extrusion and gradient filtration on the cell suspension to obtain a neutrophil exosome biomimetic vesicle-encapsulated drug suspension; where the gradient filtration is conducted with polycarbonate filter membranes of 1 μm, 400 nm, and 200 nm sequentially;
4) conducting centrifugation on the neutrophil exosome biomimetic vesicle-encapsulated drug suspension, resuspending a bottom NNV-drug cushion to obtain an NNV-drug suspension; and
5) mixing the NNV-drug suspension with a superparamagnetism material for co-incubation, and conducting magnetic separation on a co-incubated mixture to obtain the superparamagnetism-modified and neutrophil exosome biomimetic vesicle-based biological preparation for drug delivery.

In the present disclosure, co-culture is conducted on the peripheral blood neutrophils with the antitumor drug to obtain the neutrophils for uptake of the drug. Each $1\times10^6$ of the peripheral blood neutrophils are co-cultured preferably with 50 μg of the antitumor drug. There is no special limitation on sources of the peripheral blood neutrophils and the antitumor drug, and conventional extraction methods or commercially available products in the art can be used. The antitumor drug includes preferably a doxorubicin liposome (DOX-CL). The human peripheral blood neutrophils are cultured preferably in an RPMI1640 medium containing 10% fetal bovine serum for 6 h, and a solution of the antitumor drug is added to the medium for co-culture for 24 h; where the co-culture is conducted at preferably 37° C. for preferably 12 h to 24 h. After the co-culture, cytoplasm of the neutrophils contains a large amount of the antitumor drug (DOX) with red fluorescence.

In the present disclosure, centrifugation is conducted on the neutrophils for uptake of the drug, and the bottom cushion is resuspended to obtain the cell suspension. The centrifugation is conducted by preferably differential centrifugation at preferably 800 g for preferably 5 min. After the centrifugation, the bottom cushion is preferably collected, and pellets are resuspended with PBS to prepare a cell suspension of a neutrophil-encapsulated drug.

In the present disclosure, continuous physical extrusion and gradient filtration are conducted on the cell suspension to obtain the neutrophil exosome biomimetic vesicle-encapsulated drug suspension; where the gradient filtration is conducted with the polycarbonate filter membranes of 1 μm, 400 nm, and 200 nm sequentially. The continuous physical extrusion is conducted preferably 11 times on the cell suspension using the mini-extrader extruder (Avanti Polar Lipids, USA); and each 5 mL of the cell suspension is subjected to the continuous physical extrusion preferably at 300 psig with a temperature of an gas-tight syringe at not less than 10° C. A large number of neutrophil exosome biomimetic vesicles with different particle sizes can be easily and quickly prepared by the physical extrusion. The cell suspension subjected to the physical extrusion is successively filtered with the polycarbonate filter membranes of 1 μm, 400 nm, and 200 nm, and an extruded filtrate is collected to prepare the neutrophil exosome biomimetic vesicle-encapsulated drug suspension.

In the present disclosure, centrifugation is conducted on the neutrophil exosome biomimetic vesicle-encapsulated drug suspension, the bottom NNV-drug cushion is resuspended to obtain the NNV-drug suspension. The centrifugation is conducted by preferably ultracentrifugation at preferably 10,000 g for preferably 80 min. The resuspension includes preferably collecting the bottom NNV-drug cushion after the ultracentrifugation, and redispersing an NNV-drug precipitate in a PBS buffer for further purification.

In the present disclosure, the NNV-drug suspension is mixed with the superparamagnetism material for co-incubation, and magnetic separation is conducted on the co-incubated mixture to obtain the superparamagnetism-modified and neutrophil exosome biomimetic vesicle-based biological preparation for drug delivery. The superparamagnetism material includes preferably Tf-SPION with a concentration in the NNV-drug suspension of 0.5 mg/ml. The co-incubation is conducted at preferably 4° C. for preferably 4 h. The co-incubated mixture is subjected to magnetic separation preferably by a neodymium magnet at a magnetic flux (MF) density of 1 T.

The present disclosure further provides a superparamagnetism-modified and neutrophil exosome biomimetic vesicle-based biological preparation for drug delivery prepared by the preparation method. In the examples, the superparamagnetism-modified and neutrophil exosome biomimetic vesicle-based biological preparation for drug delivery is a cup-shaped membranous vesicle with a particle size of 200 nm, obtained by combining the neutrophil-extruded vesicles encapsulating DOX-CL and the Tf-SPION for magnetic separation; active ingredients of the superparamagnetism-modified and neutrophil exosome biomimetic vesicle-based biological preparation for drug delivery include neutrophil-related toxic proteins (such as FasL, GranzymeA/B, and Perforin); the superparamagnetism-modified and neutrophil exosome biomimetic vesicle-based biological preparation for drug delivery exerts a dual killing effect on gastric cancer cells by carrying the toxic proteins and the chemotherapeutic drug DOX, thereby significantly inhibiting tumor growth (a drug loading is 15%).

The superparamagnetism-modified and neutrophil exosome biomimetic vesicle-based biological preparation for drug delivery and the preparation method thereof provided by the present disclosure will be described in detail below with reference to examples, but they cannot be understood as limiting the claimed scope of the present disclosure.

Example 1

Extraction and identification of superparamagnetism-modified and neutrophil exosome biomimetic vesicle-based biological preparation for drug delivery Human peripheral blood neutrophil culture reagents included: a polymorphonuclear leukocyte separation medium (Polymorph Prep separation medium, Norway), an RPMI1640 (Bioind, USA), fetal bovine serum (Gibco, USA), trypsin (Sigma, USA), a carbon dioxide incubator (Forma), and a serum-free medium (Excell, China);

an inverted microscope (Nikon, Japan), an ultra-clean bench, a benchtop centrifuge (Eppendorf, Germany), an ultracentrifuge (Beckman, USA).

The extraction reagents for SPION-NNV-DOX biological preparation included: a SPION material and a doxorubicin liposome (Xi'an Ruixi Biological Technology. China), a Mini-extrader extruder (Avanti Polar Lipids, USA), polycarbonate filter membranes with different pore sizes of 1 μm, 400 nm and 200 nm (Xi'an Ruixi Biological Technology, China), a transmission electron microscope (FEI Tecnai 12, Philips), an ultracentrifuge (Beckman, USA), a panoramic flow cytometer (Flow sight, USA), and a NanoSight LM10 system (Nanosight Tracking Analysis, UK).

Figure 2:
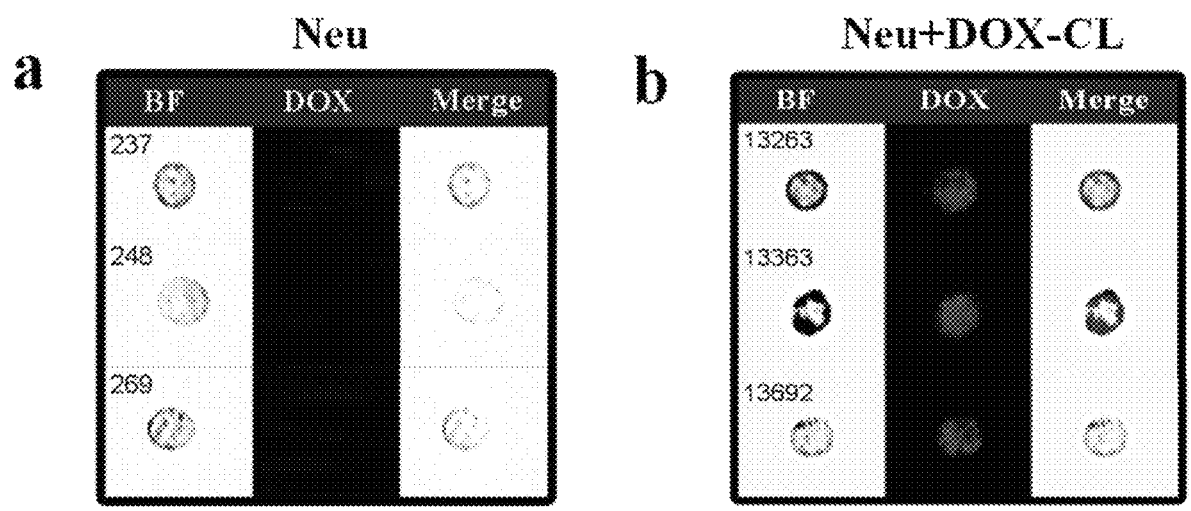
FIG. 2 shows an uptake of adriamycin liposomes by human peripheral blood neutrophils in Example 1.

The superparamagnetism-modified and neutrophil exosome biomimetic vesicle-based biological preparation for drug delivery was prepared according to a process shown in FIG. 1:

1. Human peripheral blood neutrophils and DOX-CL were co-cultured in an incubator at 37° C. for 24 h (FIG. 2).

2. Centrifugation was conducted at 800 g for 5 min (Eppendorf Centrifuge 5804/5804 centrifuge), a bottom cushion was collected, and rinsed and suspended with PBS to prepare a cell suspension.

3. The cell suspension was continuously extruded 11 times using a mini-extrader, and filtered with polycarbonate filter membranes of 1 μm, 400 nm, and 200 nm sequentially, to prepare neutrophil exosome biomimetic vesicle-encapsulated DOX (NNV-DOX).

4. Cell pellets were centrifuged by ultracentrifugation at 10,000 g for 80 min using a Beckman ultracentrifuge, to collect NNV-DOX, and the NNV-DOX pellet was redispersed in PBS.

5. An NNV-DOX suspension was co-incubated with the superparamagnetism material Tf-SPION (0.5 mg/ml) at 4° C. for 4 h.

6. A SPION-NNV-DOX complex was obtained by conducting magnetic separation on a mixture under an external neodymium magnet (MF=1 T).

Figure 3:
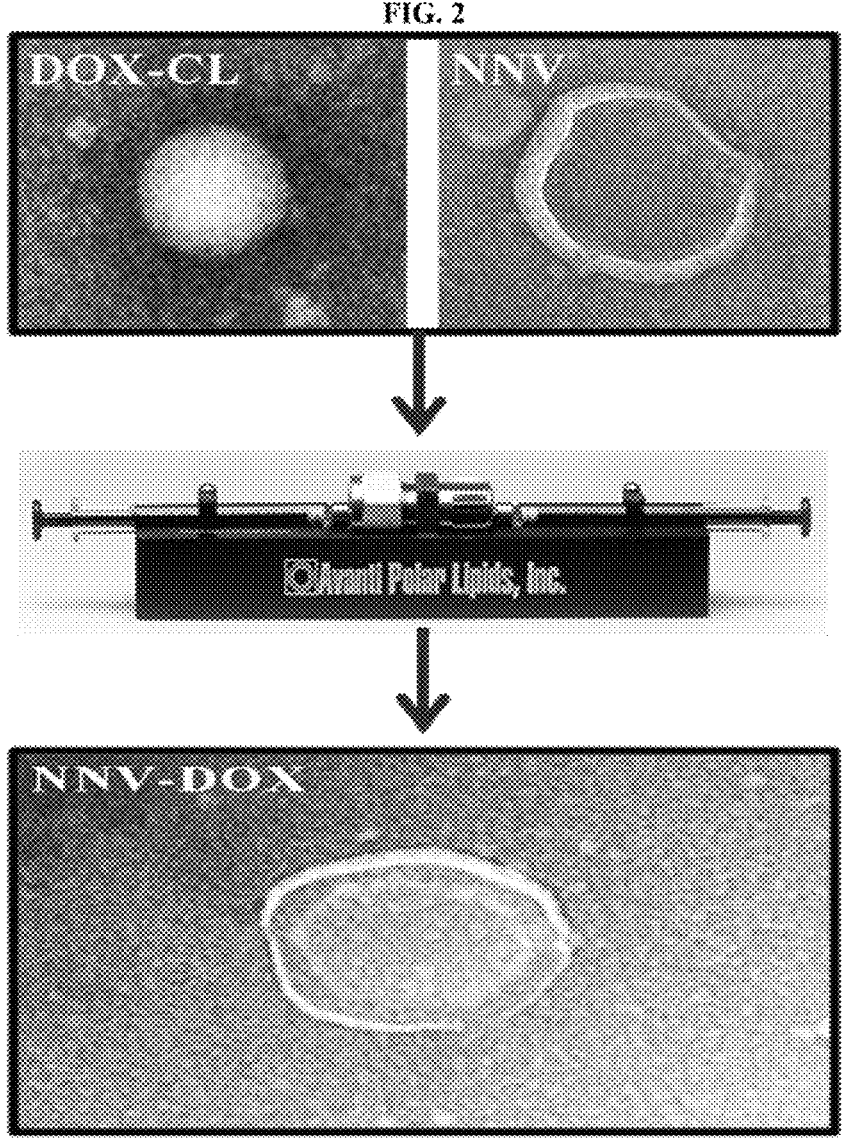
FIG. 3 shows a preparation method and a transmission electron microscope (TEM) picture of a biological preparation of a human peripheral blood neutrophil exosome biomimetic vesicle-encapsulated drug in Example 1.
Figure 4:
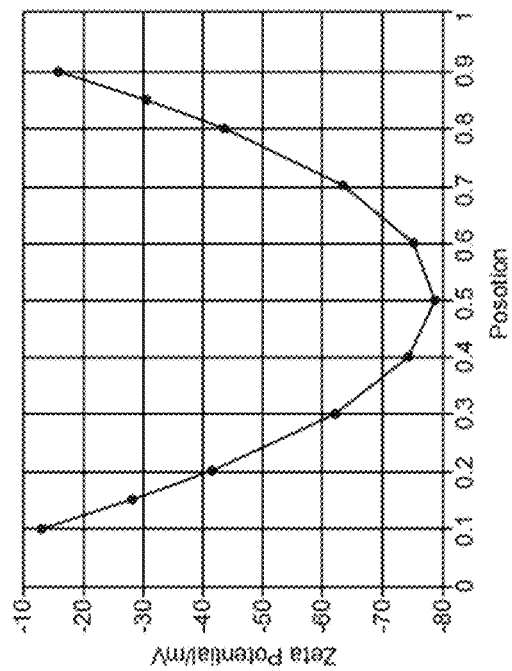
FIG. 4 shows a particle size and a zeta potential of the biological preparation of a human peripheral blood neutrophil exosome biomimetic vesicle-encapsulated drug in Example 1.
Figure 4:
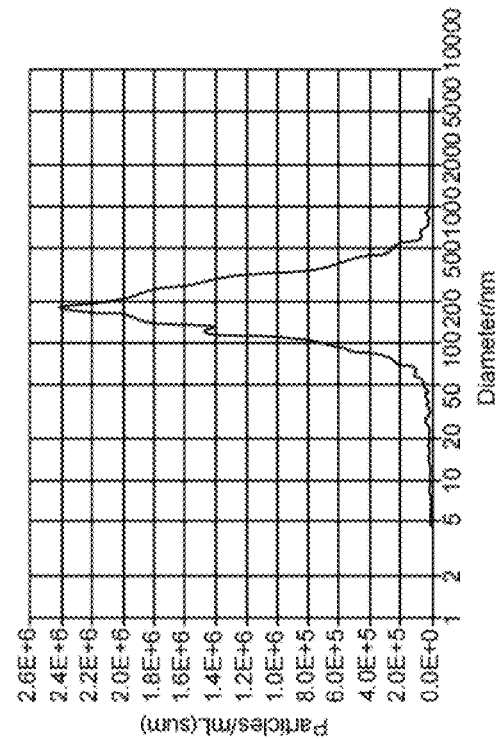

Morphological characteristics of NNV-DOX were observed by a transmission electron microscope and Nanoparticle Tracking Analysis: 20 μL for each of the doxorubicin liposome, the NNV and the NNV-DOX solution were mixed well, and added dropwise to a sample-loading copper mesh with a diameter of 2 mm, and after standing for 5 min, residual liquid was absorbed with filter papers; the copper mesh was upside down on 30 g/L phosphotungstic acid (pH 6.8) droplets, negative staining was conducted for 5 min at 25° C., the copper mesh was dried under an incandescent lamp, and observed and photographed under the transmission electron microscope. As shown in FIG. 3, the doxorubicin liposome has a diameter of about 50 nm, and the NNV has a vesicle-like structure with a size of about 180 nm; the NNV-DOX has a particle size of about 220 nm. FIG. 4 shows that the NNV-DOX has a particle size of about 200 nm 120 nm, and a potential of −29.04 mV±0.45 mV.

Example 2

In vitro antitumor effect of superparamagnetism-modified and neutrophil exosome biomimetic vesicle-based biological preparation for drug delivery on tumor cells Materials and reagents were: a 96-well cell culture plate (JET Biofil), the RPMI1640 (Bioind, USA), the trypsin (Sigma, USA), a CCK8 detection kit (Vazyme, China), and a microplate reader (FLX800, United States).

1. HGC-27 cells were digested with trypsin, centrifuged and precipitated, and the HGC-27 cells were inoculated in a 96-well cell culture plate; after the cells adhered to wall, different substances (including DOX-CL (45 μg/mL), NNV (40 μg/mL), SPION-NNV-DOX (40 μg/mL), and SPION-NNV-DOX/MF (superparamagnetism-modified and neutrophil exosome biomimetic vesicle-based biological preparation for drug delivery with antitumor effect under external magnetic field, 40 μg/mL)) were added to treat the HGC-27 cells.

2. After 24 h of treatments as above, a CCK8 detection reagent was added to the 96-well cell culture plate, and the culture plate was placed in a $CO_2$ incubator to continue culturing.

3. An absorbance of the HGC-27 cells at 450 nm was detected by a microplate reader.

Figure 5:
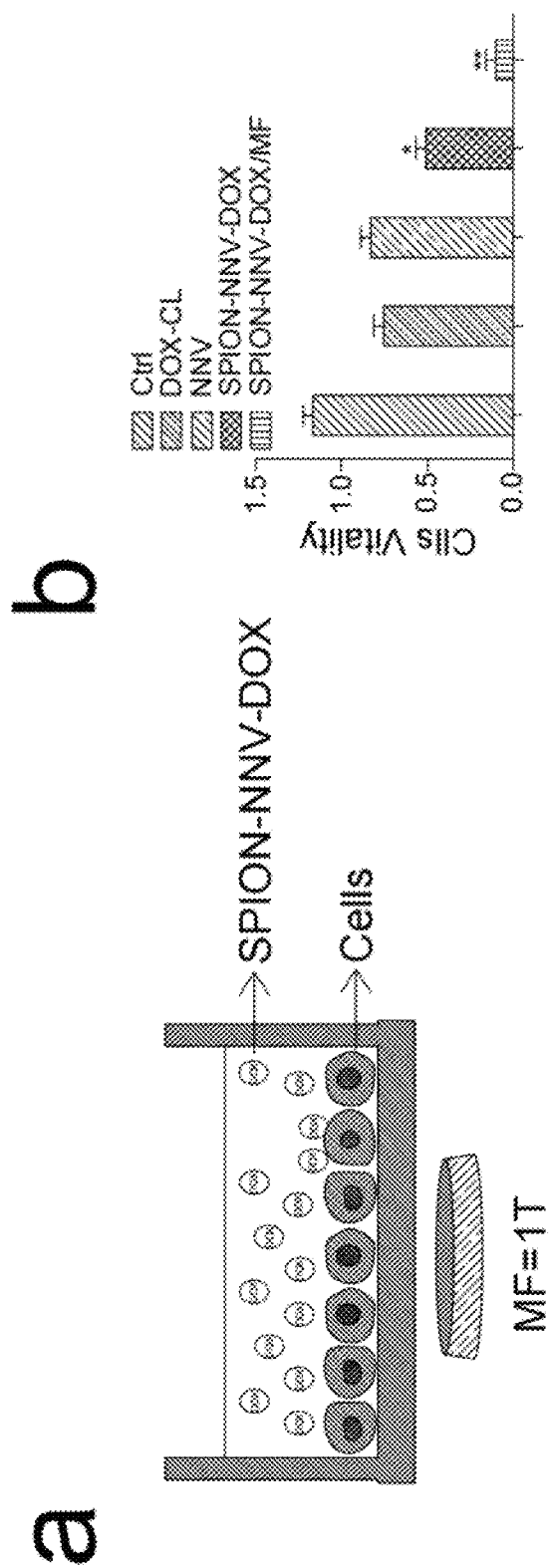
FIG. 5 shows a cytotoxic effect of the superparamagnetism-modified and neutrophil exosome biomimetic vesicle-based biological preparation for drug delivery on tumor cell lines in Example 1; where a shows a schematic diagram of in vitro co-culture of HGC-27 cells and SPION-NNV-DOX/MF; and b shows a proliferation ability of the HGC-27 cells under different treatments detected by a CCK8 cell proliferation assay.

Observation of an effect of the SPION-NNV-DOX/MF on a proliferation ability of the HGC-27 cells was conducted by CCK8 assay. The results are shown in FIG. 5. The accumulation of SPION-NNV-DOX in HGC-27 cells can be promoted by applying an external magnetic field. A longer time of magnetization leads to more SPION-NNV-DOX phagocytosed by HGC-27 cells; the SPION-NNV-DOX/MF significantly inhibits the proliferation of HGC-27 cells.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a superparamagnetism-modified and neutrophil exosome biomimetic vesicle-based biological preparation for drug delivery, comprising the following steps:

1) conducting co-culture on peripheral blood neutrophils with an antitumor drug to obtain neutrophils for uptake of the drug;
2) conducting centrifugation on the neutrophils for uptake of the drug, and resuspending a bottom cushion to obtain a cell suspension;
3) conducting continuous physical extrusion and gradient filtration on the cell suspension to obtain a neutrophil exosome biomimetic vesicle-encapsulated drug suspension; wherein the gradient filtration is conducted with polycarbonate filter membranes of 1 μm, 400 nm, and 200 nm sequentially;
4) conducting centrifugation on the neutrophil exosome biomimetic vesicle-encapsulated drug suspension, resuspending a bottom neutrophil nano vesicle (NNV)-drug cushion to obtain an NNV-drug suspension; and 5) mixing the NNV-drug suspension with a superparamagnetism material for co-incubation and conducting magnetic separation on a co-incubated mixture to obtain the superparamagnetism-modified and neutrophil exosome biomimetic vesicle-based biological preparation for drug delivery.

2. The preparation method according to claim 1, wherein in step 1), each 1×106 of the peripheral blood neutrophils are co-cultured with 50 μg of the antitumor drug.

3. The preparation method according to claim 1, wherein in step 1), the co-culture is conducted at 37° C. for 12 h to 24 h.

4. The preparation method according to claim 1, wherein in step 2), the centrifugation is conducted by differential centrifugation at 800 g for 5 min.

5. The preparation method according to claim 1, wherein in step (2), the bottom cushion is resuspended by phosphate-buffered saline (PBS).

6. The preparation method according to claim 1, wherein in step 3), the continuous physical extrusion is conducted 11 times on the cell suspension using a mini-extrader extruder.

7. The preparation method according to claim 1, wherein in step 3), each 5 mL of the cell suspension is subjected to the continuous physical extrusion at 300 psig with a temperature of a gas-tight syringe at not less than 10° C.

8. The preparation method according to claim 1, wherein in step 4), the centrifugation is conducted by ultracentrifugation at 10,000 g for 80 min.

9. The preparation method according to claim 1, wherein in step 4), the bottom NNV-drug cushion is resuspended by PBS.

10. The preparation method according to claim 1, wherein in step 5), the superparamagnetism material comprises Tf-SPION with a concentration in the NNV-drug suspension of 0.5 mg/ml.

11. The preparation method according to claim 1, wherein in step 5), the co-incubation is conducted at 4° C. for 4 h.

12. The preparation method according to claim 1, wherein in step 5), the magnetic separation is conducted by a neodymium magnet at a magnetic flux (MF) density of 1 T, and further wherein the antitumor drug comprises a doxorubicin (DOX).

13. The preparation method according to claim 2, wherein in step 1), the co-culture is conducted at 37° C. for 12 h to 24 h.

14. The preparation method according to claim 5, wherein in step (2), the bottom cushion is resuspended by phosphate-buffered saline (PBS).

15. The preparation method according to claim 8, wherein in step 3), each 5 mL of the cell suspension is subjected to the continuous physical extrusion at 300 psig with a temperature of a gas-tight syringe at not less than 10° C.

16. The preparation method according to claim 11, wherein in step 4), the bottom NNV-drug cushion is resuspended by PBS.

* * * * *